United States Patent [19]

Meeker

[11] Patent Number: 4,634,177

[45] Date of Patent: Jan. 6, 1987

[54] INTERLOCKING INFANT CARRIER AND BASE FOR CAR SEAT MOUNTING

[75] Inventor: Paul K. Meeker, Kent, Ohio

[73] Assignee: Gerber Products Company, Fremont, Mich.

[21] Appl. No.: 786,036

[22] Filed: Oct. 10, 1985

[51] Int. Cl.$^4$ .............................................. A47C 1/11
[52] U.S. Cl. .................................. 297/250; 248/501; 292/169; 297/183; 297/440
[58] Field of Search ............... 297/250, 257, 130, 183, 297/377, 440, DIG. 2; 292/169; 248/501, 502, 510; 70/432

[56] References Cited

U.S. PATENT DOCUMENTS

| | | |
|---|---|---|
| 49,159 | 8/1865 | Rowe .................................. 292/169 |
| 555,368 | 2/1896 | Gardner et al. .................... 292/169 |
| 3,290,050 | 12/1966 | Ezquerra ............................. 297/377 |
| 3,596,986 | 8/1971 | Ragsdale . | 
| 3,934,934 | 1/1976 | Farrell, Jr. et al. ............. 297/250 X |
| 4,113,306 | 9/1978 | von Wimmersperg ......... 297/250 X |
| 4,231,612 | 11/1980 | Meeker ................................. 297/250 |
| 4,306,749 | 12/1981 | Deloustal ............................ 297/440 |
| 4,345,791 | 8/1982 | Bryans et al. ...................... 297/250 |
| 4,371,206 | 2/1983 | Johnson, Jr. ....................... 297/183 |
| 4,545,613 | 10/1985 | Martel et al. . | |

FOREIGN PATENT DOCUMENTS

| | | | |
|---|---|---|---|
| 2227719 | 11/1974 | France ................................ 297/130 |
| 560531 | 4/1975 | Switzerland ....................... 297/250 |
| 2149653A | 6/1985 | United Kingdom ............... 297/183 |

*Primary Examiner*—Francis K. Zugel
*Assistant Examiner*—Thomas A. Rendos
*Attorney, Agent, or Firm*—Townsend and Townsend

[57] ABSTRACT

An infant carrier and base are provided with locking features which include a spring-mounted bolt protruding laterally from the base and a hollow or aperture in the carrier which engages the bolt when the carrier is inserted into the base. The upper surface of the bolt is sloped so that the carrier forces the bolt inward (to a retracted position) as the rim of the aperture slides over the protruding end of the bolt. A spring snaps the bolt back into place once the carrier is fully inserted and the aperture is aligned with the bolt. The carrier contains a lever arm whose fulcrum is positioned adjacent to the aperture. A spiral cam protrudes from the fulcrum to engage a knob extending upward from the side of the bolt, so that when the lever arm is rotated the cam urges the knob backward, retracting the bolt and permitting removal of the carrier from the base.

13 Claims, 7 Drawing Figures

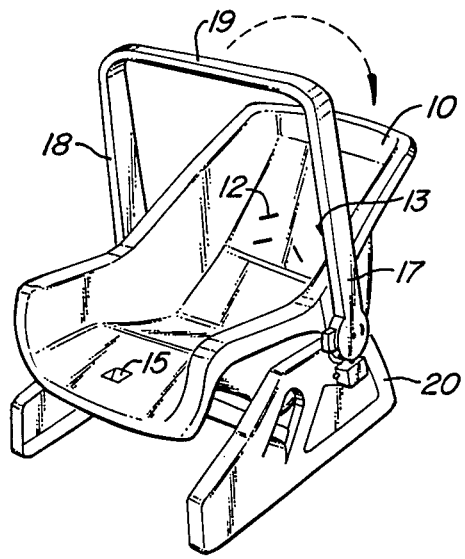
FIG._1.
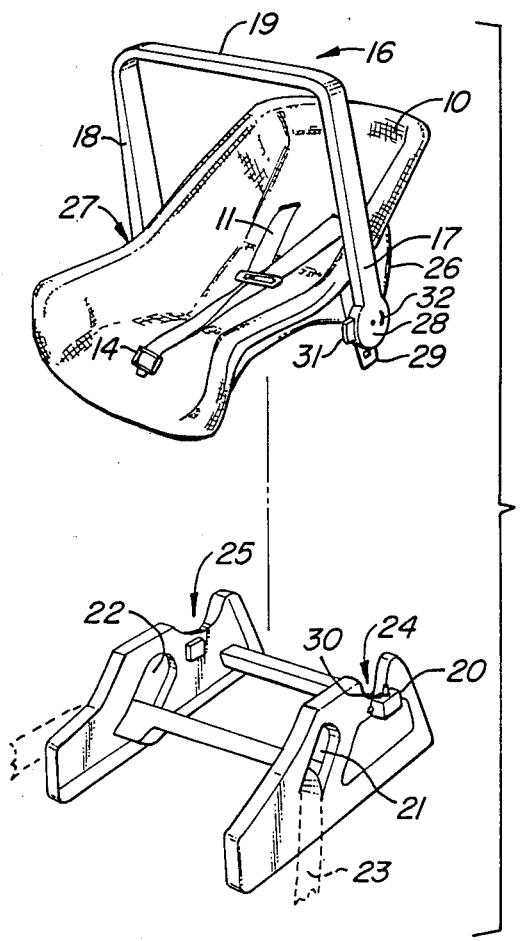
FIG._2.

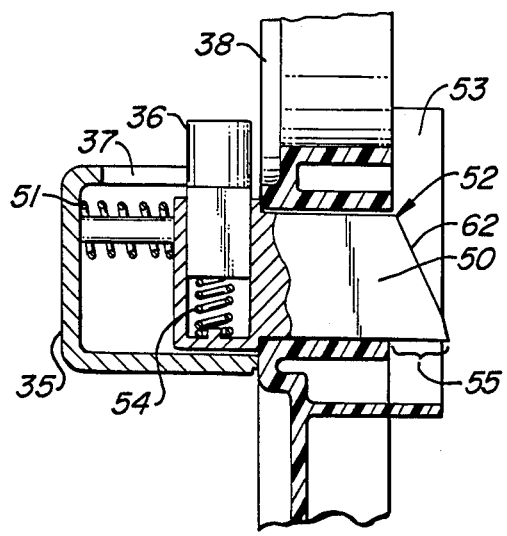
FIG._4A.
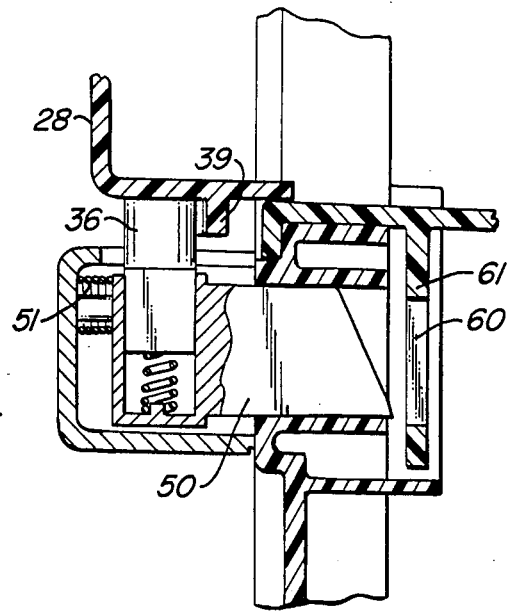
FIG._4C.
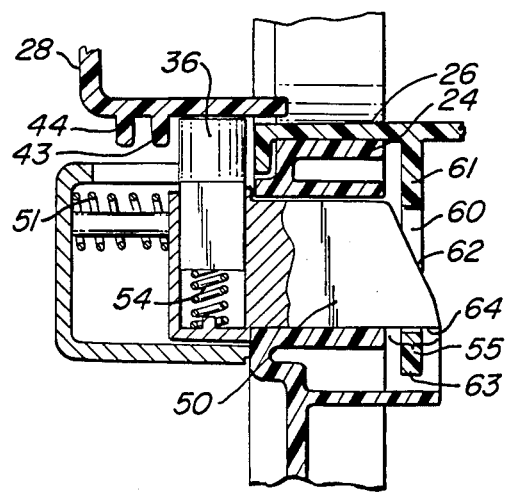
FIG._4B.
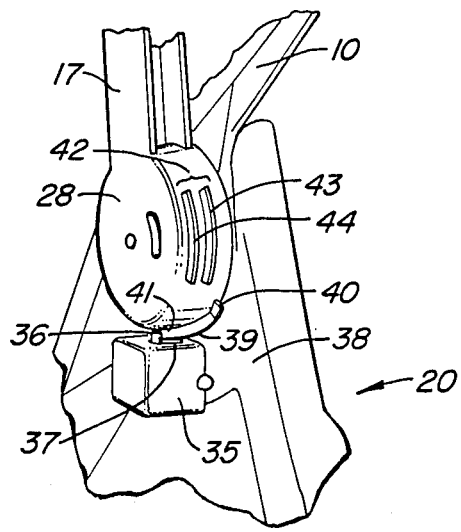
FIG._3.

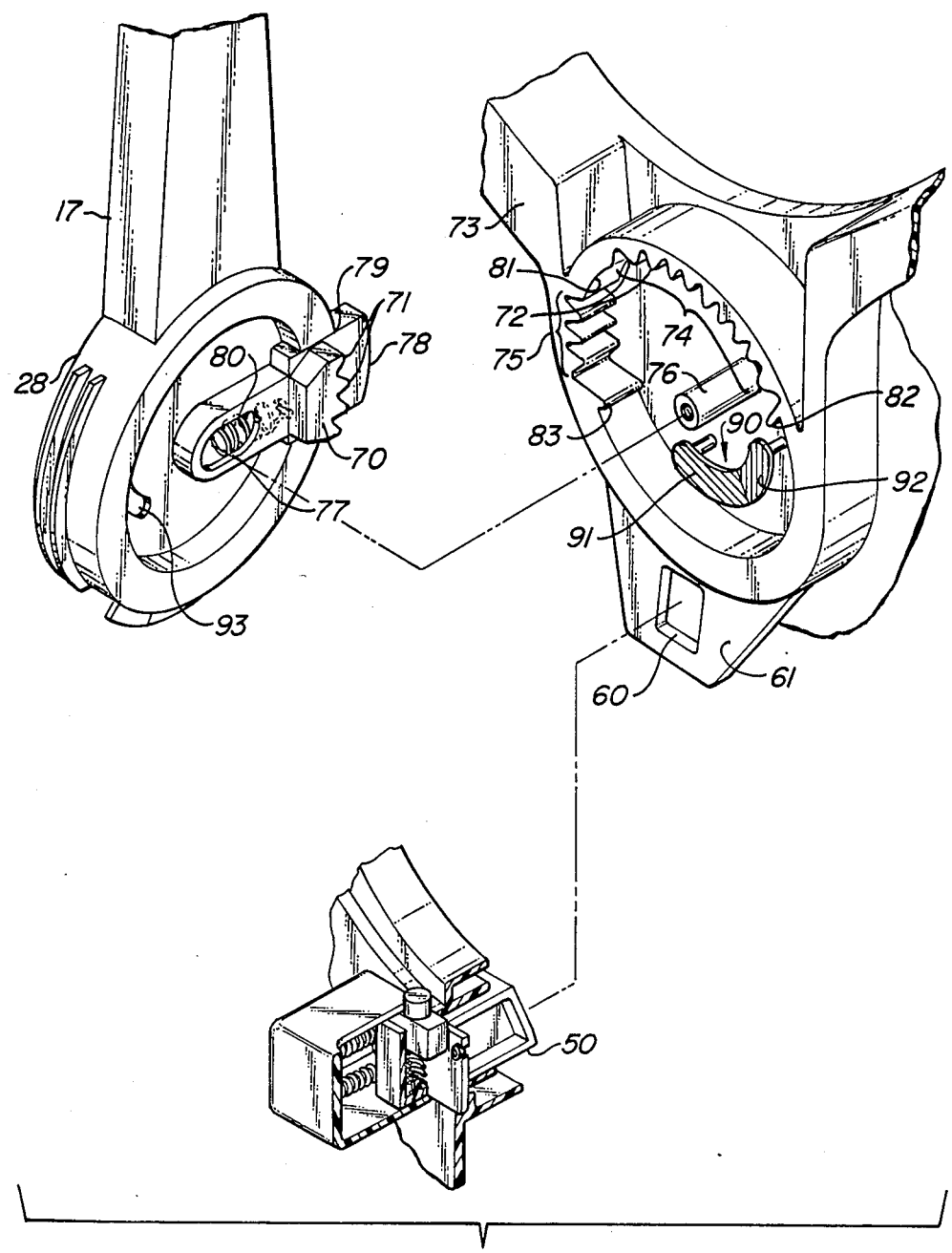
FIG._5.

INTERLOCKING INFANT CARRIER AND BASE FOR CAR SEAT MOUNTING

BACKGROUND OF THE INVENTION

This invention relates to infant carriers, and particularly the type used for securing an infant to the seat of a vehicle such as an automobile.

A variety of car seats for infants have been devised for the purpose of strapping the infant in to prevent the infant from squirming or being bounced out of the seat during the motion of the car. The driver thereby gains peace of mind as to the infant's safety and can direct full attention to the road. Getting the infant in and out of the device can be somewhat complicated, however, particularly when one wants to remove the seat itself so that the infant can be retained in the seat outside the car.

SUMMARY OF THE INVENTION

A novel structure is provided herein, whereby an infant carrier is quickly and easily inserted into and removed from a base mountable to a car seat, with locking features which prevent accidental disengagement during motion either of the car or of the infant. The mechanism consists of a spring-mounted bolt protruding laterally from the base, and a hollow or aperture in the carrier which slides over the bolt as the carrier is being inserted into the base and engages the bolt once the carrier is in place. One of the surfaces on the bolt is sloped so that the carrier forces the bolt inward (i.e., to the retracted position) as the carrier slides over the bolt. The mounting of the bolt in the base is spring-biased outward causing it to snap into the aperture when the latter is placed over it. The bolt is also manipulated by a projection extending transverse to the sliding direction, which is engaged by a cam protruding from the fulcrum of a lever arm on the carrier. The cam is spiral in shape to urge the projection backward when the lever arm is turned. Thus, removal of the carrier from the base is achieved by turning the lever arm.

BRIEF DESCRIPTION OF THE DRAWINGS

FIG. 1 is a rear perspective view of an example of a carrier set in a base, to which the locking and release mechanism of the present invention may be incorporated.

FIG. 2 is a rear perspective view of the carrier and base of FIG. 1 shown separated, further showing a strap on the carrier for holding an infant, and a seat belt by which the base is secured to an automobile seat.

FIG. 3 is an enlarged front perspective view of a portion of the example shown in FIG. 1, this figure showing the connection between the carrier and the base and the portions housing the locking and release mechanism.

FIGS. 4A, 4B, and 4C are cross-sections of the connecting portions shown in FIG. 3; FIG. 4A showing the base portion alone; FIG. 4B showing the base portion and carrier portion combined, with the locking bolt engaged; and FIG. 4C showing the base portion and carrier portion combined, with the locking bolt retracted.

FIG. 5 is an exploded perspective view of the base and carrier connecting portions shown in FIGS. 4A, 4B and 4C.

DETAILED DESCRIPTION OF THE INVENTION AND PREFERRED EMBODIMENTS

An example of an assembled infant carrier and base incorporating the locking mechanism of the present invention is shown in FIG. 1, and the carrier and base are shown separately in FIG. 2. The carrier 10 holds a reclining infant, who is secured in place by a strap 11. In the view shown, the infant is generally facing in the direction of the viewer. The strap 11 is anchored at points 12, 13 in the upper half of the carrier 10 above each of the infant's shoulders, then extends downward over the infant's torso to a clasp 14 which mates with a receiving catch 15 positioned between the infant's legs. In the view shown, therefore, the infant faces generally upward from the plane of these figures.

A handle 16 consisting of two rotatable lever arms 17, 18 joined by a crossbar 19 provides for convenient lifting and carrying of the carrier.

The base 20 is designed both for attachment to a car seat and for securely holding the carrier 10. Holes 21, 22 in the base permit passage of a safety belt 23 as found in the passenger seat of a typical automobile, permitting the base to be securely fastened to the passenger seat.

The base contains contoured sections 24, 25 to mate with similarly contoured sections 26, 27 on the carrier (only one of which is visible in the view shown in FIGS. 1 and 2). In the embodiment shown, the contoured sections in the carrier are the hubs 28 at the fulcrum of each lever arm 17, 18 on the carrier 10. At the locations of these contoured sections are the mating parts 29, 30 of a latch, whose opening and closing is controlled by the position of the hub 28. The hub further contains a release button 31 which controls the locking mechanism, and an indicator window 32 to indicate whether the lock is open or closed.

FIG. 3 provides a closer look of the lever arm hub 28, turned around to show the side opposite that visible in FIGS. 1 and 2. In this view, the carrier 10 is joined to the base 20 and the lever arm 17 is vertical. Mating parts of the latch are not visible in this view. The locking mechanism controlling the position of the latch, however, is encased in an enclosure 35 protruding from the side of the base 20. A projection 36 extending upward from the interior of the enclosure is capable of moving laterally back and forth through a slot 37 in the upper wall of the enclosure. This projection is spring-mounted inside the enclosure and thereby biases inward (toward the carrier frame).

The projection 36 may be pushed backward in the slot 37 away from the base frame 38 (and thereby compressing the spring, not shown) by a spiral cam 39 protruding from the hub 28. One end 40 of the cam is sufficiently far forward so that it does not interfere with the projection 36, while the other end 41 is backward of the forward end 40, a sufficient distance to engage the projection 36, forcing it back far enough to disengage the lock. Thus, disengagement of the lock is achieved by turning the lever arm.

An additional feature on the exterior of the hub is a stop 42, shown in this embodiment as a pair of parallel barriers 43, 44, following the curvature of the hub in nonspiraling manner. The barriers are positioned on the hub so that they clear the spiral cam 39. Thus, when the lever arm 17 is rotated toward the head of the carrier (i.e., diagonally outward and to the right from the plane of FIG. 3), the barriers 43, 44 will be positioned over the projection 36, and the barier 43 closest to the base frame 38 will limit the travel of the projection 36 in the slot 37, holding it forward and preventing release of the lock. The outermost barrier 44 is a backup.

The interior of the base frame 38 and the locking mechanism enclosure 35 is shown in FIG. 4A. Inside the enclosure is a bolt 50, biased toward the right by a spring 51 referred to above. The enclosure 35 only partially encloses the bolt 50, leaving a major portion of the bolt 50 extending to the right into an aperture 52 in the base frame 38, and beyond to protrude into the interior space 53 of the base into which the carrier fits when the parts are assembled. The projection 36 is a knob extending transversely from the bolt 50 through the slot 37 in the upper wall of the enclosure 35. In the embodiment shown, the projection 36 is not rigidly secured to the bolt 50, but is instead spring-mounted by an internal coil spring 54, urging the projection upward. This ensures contact between the projection and the hub of the lever arm on the carrier when the parts are assembled, thereby ensuring that the projection is properly engaged with the cam when release of the bolt is desired.

In the condition shown in FIG. 4A, the spring 51 governing the position of the bolt 50 is fully relaxed, causing the bolt 50 to protrude to its fullest degree beyond the base frame 38. In this position, the protruding portion 55 extends into a hollow or aperture in the carrier structure, holding the carrier in place.

This aperture 60 is shown in FIG. 4B, which shows the carrier inserted into position in the base. Here the contoured section 26 of the carrier frame is mated with the contoured section 24 of the base. The aperture 60 is surrounded by a tab 61 extending downward from the contoured section 26 of the carrier frame. The protruding portion 55 of the bolt 50 has a sloping surface 62, which causes the bolt 50 to yield when a transverse contact force, such as that caused by sliding the tab 61 downward into position, is applied. During insertion, therefore, the lower edge 63 of the tab 61 pushes down on the sloping surface 62, forcing the bolt to retract (to the left in the view shown in the drawing) toward the interior of the enclosure, compressing the spring 51. When the carrier is fully inserted and the tab 61 is pushed all the way down, the bolt 50 snaps back into the aperture 60 under the force of the spring 51. The bottom surface 64 of the protruding portion of the bolt is straight so that the bolt will not yield when an upward force is applied to the carrier, but will instead hold and lock the tab 61 in place. The only way that the bolt can then be retracted (and the tab released) is by sliding back the projection 36. With the hub 28 of the lever arm in the position shown in FIG. 4B, the stops 43, 44 prevent this from happening.

Manipulation of the projection and release of the tab is achieved by rotating the lever arm so that the hub 28 is in the position shown in FIG. 4C. In this position, the projection 36 is engaged by the spiral cam 39, which has forced the projection back (to the left), compressed the spring 51, and retracted the bolt 50 so that it completely clears the aperture 60 in the tab 61. The carrier may now be lifted out of the base. Once the carrier is removed, however, the projection 36 will be released and the spring 51 will force the bolt 50 back into the position shown in FIG. 4A.

A perspective view of the locking mechanism with parts broken away is shown in FIG. 5. This view also shows the interior of the hub and a further locking mechanism designed to hold the lever arm in either of two fixed points along its rotation, thereby preventing undesired release of the bolt 50 from the aperture 60.

Locking is achieved by a spring-biased detent 70 mounted inside the hub 28 of the lever arm 17. The detent consists of a row of teeth 71 which mate with a second row of teeth 72 (notches) on the carrier frame 73. The latter row is divided into two sections 74, 75. The first section 74 is positioned to engage the detent when the lever arm is rotated fully forward (the carrier thus locked into the base). The other section 75 is positioned to engage the detent when the lever arm is rotated upright to retract the bolt and thus release the carrier from the base. The detent is mounted on a pin 76 which passes through the center of the hub 28 and about which the lever arm rotates. The connection between the pin and the detent is a sliding connection, by virtue of an elongated slot 77 through which the pin 76 passes. A button 78 extends from the end of the detent opposite the slot 77, passing through an opening 79 in the side wall of the hub 28 to protrude outward. An internal spring 80 biases the detent outward, thereby urging the teeth 71 on the detent toward engagement with the teeth 72 on the carrier frame. Release of the detent is accomplished by pressing the button 78 inward, and expanding the spring, thus placing the latter under tension.

In the carrier frame 73, the two sections 74, 75 of the notches are separated by an unnotched surface 81, which permits free rotation of the lever arm when the teeth 71 of the detent are in contact with this section. This section forms the arc of a circle having its center at the axis pin 76. The notches preferably extend outward from this section so that when the lever arm 17 is rotated, the teeth 71 of the detent will freely fall into the notches in either of the two sections 74, 75 depending on the direction of rotation of the lever arm 17, and lock into position. The spring 80 forcing the teeth into the notches will prevent further rotation. As a further safeguard against rotation, a pair of bariers 82, 83 are positioned at opposite ends of the two notch sections 74, 75, respectively, to further prevent rotation should the spring 80 fail.

A color indicator 90 having two sections, green 91 and red 92, is circumferentially arranged around the axial pin 76 in a fixed position in the carrier frame 73. A window 93 is positioned in the hub directly over the color indicator 90, shaped and sized to reveal one full section. As the lever arm 17 is rotated between the two extreme positions which are governed by the two notch sections 74, 75, the color appearing through the window 93 changes from one color to the other. This indicates to the operator that the detent is fully engaged with the appropriate section of notches and the lock is fully secure before either lifting the carrier out of the base or proceeding to drive an automobile with the carrier inserted into the base.

The foregoing description is offered for illustrative purposes only. Numerous modifications and variations will be readily apparent to those skilled in the art, while still falling within the spirit and scope of the invention as claimed hereinbelow.

What is claimed is:

1. Apparatus for locking an infant carrier into a base which is mountable to a car seat, said apparatus comprising:
   a bolt slidably mounted to said base and spring-biased to project laterally therefrom said bolt having a sloping surface oriented to yield under a transverse contact force and thereby cause retraction of said bolt;

a hollow in said carrier to receive said bolt, said hollow having a rim capable of exerting said transverse contact force to said sloping surface of said bolt during insertion of said carrier into said base;

a projection extending transversely from said bolt; and a lever arm mounted to said carrier, said lever arm having a cam protruding radially from the fulcrum thereof to engage said projection when said carrier is inserted into said base, said cam being spiraled to urge said projection backward and thereby retract said bolt upon turning of said lever arm.

2. Apparatus in accordance with claim 1 further comprising a stop extending radially from said fulcrum to prevent backward motion of said projection and thereby retraction of said bolt when said projection is not engaged by said cam.

3. Apparatus in accordance with claim 1 in which said sloping surface is the uppermost surface of said bolt and said projection extends upward from said bolt.

4. Apparatus in accordance with claim 1 in which a portion of said bolt is enclosed within said base and said projection extends through a slot in said base.

5. Apparatus in accordance with claim 1 in which said bolt is shaped to prevent removal thereof from said hollow without turning said lever arm to engage said cam with said projection.

6. Apparatus in accordance with claim 1 further comprising a second said bolt, said bolts projecting inward from opposite sides of said base; a second said hollow in said carrier to receive said second bolt; a second said projection extending transversely from said second bolt; and a second said lever arm.

7. Apparatus in accordance with claim 1 further comprising a detent slidably mounted to said lever arm, and a row of notches in said carrier to engage said detent and thereby prevent rotation of said lever arm.

8. Apparatus in accordance with claim 7 in which said detent is spring-biased toward said row of notches.

9. Apparatus in accordance with claim 7 in which said row of notches is curved along an arc of a circle having its center at the fulcrum of said lever.

10. Apparatus in accordance with claim 9 in which said row of notches is comprised of first and second sections spaced apart along said arc to define opposite ends of a range of rotation of said lever arm, said first and second sections being separated by an unnotched surface permitting free rotation of said lever arm.

11. Apparatus for locking an infant carrier into a base which is mountable to a car seat, said apparatus comprising:

a bolt slidably mounted inside said base with one end protruding laterally therefrom the uppermost surface of said protruding end sloping downward, said bolt being spring-biased outward;

a tab extending downward from said carrier, having an aperture to receive said protruding end of said bolt;

a knob extending upward from a non-protruding portion of said bolt through a slot in said base permitting lateral travel of said knob;

a lever arm mounted to said carrier, terminating in a cylindrical hub at the fulcrum of said lever arm;

a cam protruding from the side wall of said cylindrical hub to engage said knob when said carrier is inserted into said base, said cam being spiraled to urge said knob backward upon turning of said lever arm; and a stop protruding from the side wall of said hub to prevent backward motion of said knob when said knob is not engaged by said cam.

12. Apparatus in accordance with claim 11 in which said knob is spring-biased upward.

13. Apparatus for locking an infant carrier into a base which is mounted to a car seat, said apparatus comprising:

a bolt slidably mounted inside said base with one end protruding laterally therefrom, the uppermost surface of said protruding end sloping downward, said bolt being spring-biased outward;

an aperture in the side of said carrier to receive said protruding end of said bolt;

a knob extending upward from said bolt;

a lever arm mounted to said carrier and terminating in a cylindrical hub at the fulcrum thereof, positioned to rest above said bolt when said carrier is inserted into said base;

a cam along the outer surface of the side wall of said cylindrical hub to engage said knob when said carrier is inserted into said base, said cam being spiraled to urge said knob in the backward direction away from said protruding end upon rotation of said lever arm;

a detent mounted to said cylindrical hub in slidable manner along a radial direction thereof, said detent being spring-biased away from the center of said hub;

first and second rows of notches in said carrier to engage said detent and separted by an unnotched surface, said first and second rows and said unnotched surface curving along an arc of a circle coaxial with the center of said hub, said first row positioned to engage said detent when said lever arm is in a position whereby said knob is held backward by said cam, and said second row positioned to engage said detent when said lever arm is in a position whereby said knob is clear of said cam.

* * * * *